US009162806B2

(12) United States Patent
Fishel et al.

(10) Patent No.: US 9,162,806 B2
(45) Date of Patent: *Oct. 20, 2015

(54) BAG IN BOX CLEANABLE CONNECTOR SYSTEM HAVING CONICAL PLUNGER

(75) Inventors: Michael Fishel, Atlanta, GA (US); Ian Darby, Leicester (GB); Chris Bowers, Iver Heath (GB)

(73) Assignee: The Coca-Cola Company, Atlanta, GA (US)

( * ) Notice: Subject to any disclaimer, the term of this patent is extended or adjusted under 35 U.S.C. 154(b) by 288 days.

This patent is subject to a terminal disclaimer.

(21) Appl. No.: 13/476,536

(22) Filed: May 21, 2012

(65) Prior Publication Data

US 2013/0327794 A1 Dec. 12, 2013

(51) Int. Cl.
*F16L 37/32* (2006.01)
*B65D 77/06* (2006.01)
*B67D 7/02* (2010.01)
*B67D 1/08* (2006.01)

(52) U.S. Cl.
CPC ............ *B65D 77/067* (2013.01); *B67D 1/0829* (2013.01); *B67D 1/0831* (2013.01); *B67D 1/0835* (2013.01); *B67D 7/0294* (2013.01); *F16L 37/32* (2013.01)

(58) Field of Classification Search
CPC .. B65D 77/067; B67D 7/0294; B67D 1/0831; B67D 1/0829; B67D 1/0835; B67D 3/042; B67D 3/0067; B67D 3/0043; F16L 37/32
USPC ......... 251/149.6, 144, 149.9, 149.1; 137/587, 137/588; 222/105, 152, 490
See application file for complete search history.

(56) References Cited

U.S. PATENT DOCUMENTS

| | | | | | |
|---|---|---|---|---|---|
| 3,399,695 | A | * | 9/1968 | Stehlin | 137/551 |
| 3,504,699 | A | * | 4/1970 | Grise | 137/846 |
| 3,851,666 | A | * | 12/1974 | Hammond | 137/614.04 |
| 3,941,149 | A | * | 3/1976 | Mittleman | 137/493.1 |
| 4,137,930 | A | * | 2/1979 | Scholle | 137/68.19 |
| 4,143,853 | A | * | 3/1979 | Abramson | 251/149.1 |
| 4,286,636 | A | * | 9/1981 | Credle | 141/114 |

(Continued)

FOREIGN PATENT DOCUMENTS

| | | |
|---|---|---|
| EP | 0 156 500 A1 | 10/1985 |
| WO | 01/79739 A2 | 10/2001 |

(Continued)

*Primary Examiner* — John K Fristoe, Jr.
*Assistant Examiner* — David Colon Morales
(74) *Attorney, Agent, or Firm* — Sutherland Asbill & Brennan LLP (57) ABSTRACT

The system and method discloses a cleanable connector system for a Bag-In-Box ("BIB") type package having a valve arrangement that prevents the mixing of product within the bag and in the line. Various embodiments provide a connector system including a valve arrangement having a line-side valve and a bag-side valve, wherein the valve arrangement allows connection to a bag and to a line-side connector while preventing the product within the bag and in the line from mixing. The system improves the user experience by only requiring a relatively weak connection force between the line-side valve and the bag-side valve. The system and method improves the shelf life of products within the bag and reduces the risk of contamination of the bag, the line, and the product within the bag by minimizing the risk of introducing biological and other foreign material into the system when connecting the bag and the line.

20 Claims, 8 Drawing Sheets (56) References Cited

U.S. PATENT DOCUMENTS

| | | | |
|---|---|---|---|
| 4,334,551 A * | 6/1982 | Pfister | 137/614.03 |
| 4,436,125 A * | 3/1984 | Blenkush | 141/330 |
| 4,564,132 A * | 1/1986 | Lloyd-Davies | 222/522 |
| 4,610,469 A * | 9/1986 | Wolff-Mooij | 285/260 |
| 4,629,159 A * | 12/1986 | Wellenstam | 251/149.6 |
| RE32,354 E | 2/1987 | Savage | |
| 4,700,744 A * | 10/1987 | Rutter et al. | 137/614.04 |
| 4,948,014 A * | 8/1990 | Rutter et al. | 222/83 |
| 5,004,123 A * | 4/1991 | Stoody | 222/94 |
| 5,213,236 A * | 5/1993 | Brown et al. | 222/212 |
| 5,255,699 A * | 10/1993 | Herzan et al. | 137/1 |
| 5,445,186 A * | 8/1995 | Richter et al. | 137/614.2 |
| 5,477,883 A * | 12/1995 | Totten | 137/614.03 |
| 5,535,785 A * | 7/1996 | Werge et al. | 137/843 |
| 5,655,687 A * | 8/1997 | Fitten et al. | 222/212 |
| 5,697,410 A * | 12/1997 | Rutter et al. | 141/346 |
| 5,815,182 A * | 9/1998 | Otis et al. | 347/85 |
| 6,095,381 A * | 8/2000 | Schwanenberg | 222/490 |
| 6,112,951 A * | 9/2000 | Mueller | 222/490 |
| 6,142,446 A * | 11/2000 | Leinsing | 251/149.1 |
| 6,347,785 B1 * | 2/2002 | Copp et al. | 251/149.6 |
| 6,419,670 B1 * | 7/2002 | Dikeman | 604/533 |
| 6,450,375 B1 * | 9/2002 | Hins et al. | 222/491 |
| 7,044,441 B2 * | 5/2006 | Doyle | 251/149.6 |
| 7,487,951 B2 * | 2/2009 | Johnson | 251/149.1 |
| 7,500,582 B2 * | 3/2009 | Pritchett et al. | 222/321.7 |
| 7,559,530 B2 * | 7/2009 | Korogi et al. | 251/149.6 |
| 7,762,278 B2 * | 7/2010 | Adams et al. | 137/614.04 |
| 7,766,304 B2 * | 8/2010 | Phillips | 251/149.6 |
| 2002/0079704 A1 * | 6/2002 | Rutter et al. | 285/391 |
| 2004/0200738 A1 * | 10/2004 | Rovelli et al. | 206/217 |
| 2004/0227120 A1 * | 11/2004 | Raybuck | 251/149.1 |
| 2004/0232374 A1 * | 11/2004 | Rutter et al. | 251/149.6 |
| 2006/0049208 A1 * | 3/2006 | Daansen | 222/212 |
| 2006/0111694 A1 * | 5/2006 | Fukai et al. | 604/905 |
| 2009/0232586 A1 * | 9/2009 | Diodati et al. | 403/14 |
| 2009/0259175 A1 * | 10/2009 | Nordgren | 604/30 |
| 2010/0116371 A1 * | 5/2010 | Gaus | 137/855 |
| 2010/0176151 A1 * | 7/2010 | Johnson | 222/92 |
| 2012/0118416 A1 | 5/2012 | Johnson | |
| 2013/0105015 A1 | 5/2013 | Deo et al. | |

FOREIGN PATENT DOCUMENTS

| | | |
|---|---|---|
| WO | 2010/080893 A1 | 7/2010 |
| WO | 2011/100937 A1 | 8/2011 |

* cited by examiner

Fig_6

Fig_7

BAG IN BOX CLEANABLE CONNECTOR SYSTEM HAVING CONICAL PLUNGER

I. CROSS-REFERENCE TO RELATED APPLICATIONS

The present patent application is related to co-pending U.S. patent application Ser. No. 13/476,476, filed May 21, 2012, the disclosure of which is incorporated herein by reference.

II. FIELD OF THE INVENTION

The present disclosure relates generally to a cleanable connector system for a Bag-In-Box ("BIB") type package. More particularly, the present disclosure relates to a cleanable BIB connector system having a valve arrangement that prevents the mixing of product within the bag and in the line.

III. BACKGROUND OF THE INVENTION

In packaging, a bag-in-box or BIB is a type of container for the storage and transportation of liquids. It consists of a plastic bag seated inside a corrugated fiberboard box. BIB packages are well known for containing and dispensing liquids such as syrup for post-mix soft drink dispensers. The plastic bag has a spout for feeding the syrup to the post-mix beverage dispenser via a hose and a pump.

A typical self-sealing valve disposed in the fitment of a collapsible bag for use in a BIB dispensing system is disclosed in U.S. Pat. No. 4,445,539 to Credle issued May 1, 1984. As described in that patent a quick-disconnect line-side coupling is operatively associated with a self-sealing bag-side valve such that when the valves are coupled together the respective valve poppets of the bag-side valve open to permit the flow of syrup through the associated line-side connector to the beverage dispenser pump.

Currently used bag-side valves and line-side couplings are adequate for low viscosity carbonated beverages such as soft drinks but present problems when used with thicker liquids such as juices and especially with liquids containing particulates such as pulpy orange juice. Currently used systems are also designed for acidic beverages, which are less prone to microbial contamination. These systems however may experience contamination issues when used with less acidic liquids.

Other requirements for BIB systems are that they are easy to connect, they minimize contamination, minimize the potential for spill, they are easy to clean with standard regimes, and they ensure flow is adequate under normal operations.

IV. SUMMARY OF THE INVENTION

The present disclosure relates to a self-sealing bag-side valve in a bag-in-box (BIB) container for use with a quick-disconnect line-side coupling. More specifically, the present disclosure relates to an improved bag-side valve and improved line-side coupling.

The issues discussed above are addressed by the present disclosure. A push and lock connection is used instead of the previously used and unreliable screw connection. This reduces spillage and contamination.

The bag-side valve is a one-way valve formed of an elastomeric membrane. When fluid is not being pumped from the bag and through the system the valve is closed, reducing back flow into the bag and the contamination this can cause.

The plunger of the line-side coupling is enclosed by a sleeve (gator) so that the spring and other parts do not contact the fluid. This prevents them from being gummed up by particulates in the fluid and from being exposed to microbes. In addition, the flow path through the coupling is stream-lined so that potential areas of contamination are eliminated and the coupling remains as clean as possible during operation. Dead spots are reduced, orifices are enlarged and trap points are reduced or eliminated. Due to streamlining, flow through the coupling is higher, which further reduces accumulation of particulates or accumulation of sticky residue.

Cleaning of the equipment used with BIB systems involves Clean-In-Place (CIP) methods of blowing pressurized fluid through the line-side connector. Enclosed parts and streamlining of the fluid flow allow for more efficient clean-in-place (CIP) cleaning. In addition, the nose of the line-side coupling has an outer form surrounding it. This allows for cleaning of the nose during CIP.

The present disclosure provides several advantages over previous BIB connectors, particularly for use with fluids containing particulates and having a higher pH. The BIB connector has reduced contamination risk due to the one way bag-side valve, the push and lock connection means, the enclosed coupling spring, and the streamlined fluid flow path.

Given the following enabling description of the drawings, the disclosure should become evident to a person of ordinary skill in the art.

VI. DETAILED DESCRIPTION OF THE DRAWINGS

The present disclosure, in at least one embodiment, describes a cleanable connector system for a Bag-In-Box ("BIB") type package. In at least one embodiment, the present disclosure provides a connector system including a valve arrangement having a line-side valve and a bag-side valve, wherein the valve arrangement allows connection to a bag and to a line-side connector while preventing the product within the bag and in the line from mixing. In at least one embodiment, the present disclosure improves the shelf life of products contained within the bag and reduces the risk of contamination of the bag, the line, and the product contained within the bag by minimizing the risk of introducing biological and other foreign material into the system when connecting the bag and the line.

In at least one embodiment, the present disclosure provides a line-side connector including a valve arrangement having a conical shaped plunger that requires the use of a relatively weak resilient element or spring. In at least one embodiment, the present disclosure provides a plunger that seals the vacuum line when the line-side valve is disconnected from the product bag thereby preventing a vacuum from being generated within the line-side valve. In at least one embodiment, the present disclosure improves the user connection experience by allowing a relatively low connection force to be used when connecting the line-side connector to a bag-side connector.

Figure 1:
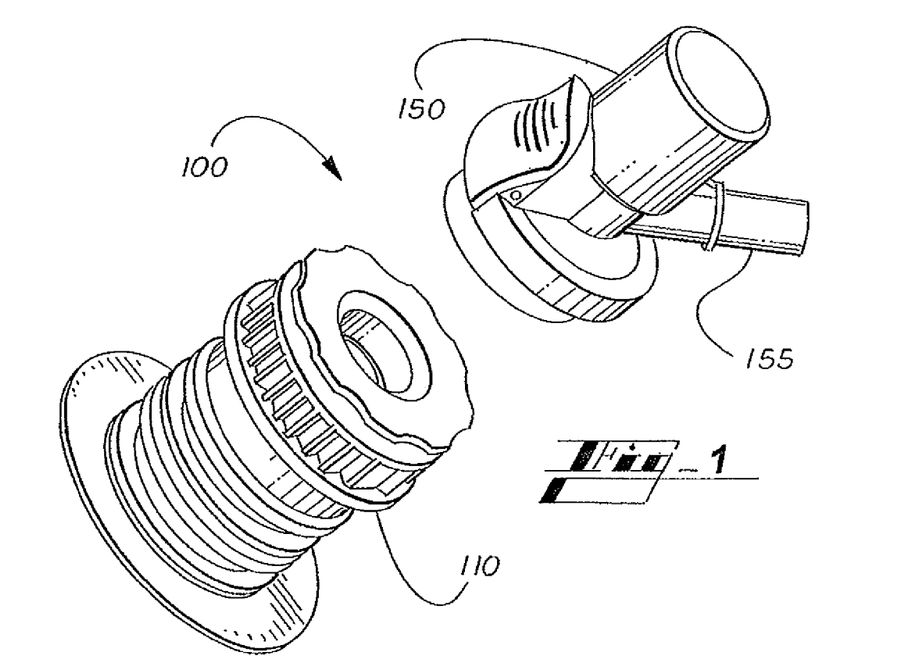
FIG. 1 illustrates an example of the connector system in accordance with an embodiment of the present disclosure, including a bag-side connector and a line-side connector.

FIGS. 1-9 illustrate various aspects of a BIB connector system 100 in accordance with at least one embodiment of present disclosure. As shown in FIG. 1, the connector system 100 includes a bag-side connector 110 and a line-side connector 150. The bag-side connector 110 is arranged and configured to connect to a bag gland (not shown) that stores a product to be dispensed. The line-side valve 150 is arranged and configured to connect to a line (not shown). As will be discussed more thoroughly below, the bag-side connector 110 and the line-side connector 150 are arranged and configured to engage in a manner that facilitates dispensing the product stored in the bag gland via the line-side connector 150. In at least some embodiments, the bodies of the bag-side connector 110 and the line-side connector 150 are preferably each formed into a one-piece body from a resilient, food-safe material, such as stainless steel, thermoplastic polyethylene terephthalate (PET), polyethylene (PE), or polypropylene (PP), which reduces the risk of compromise during cleaning.

Figure 2:
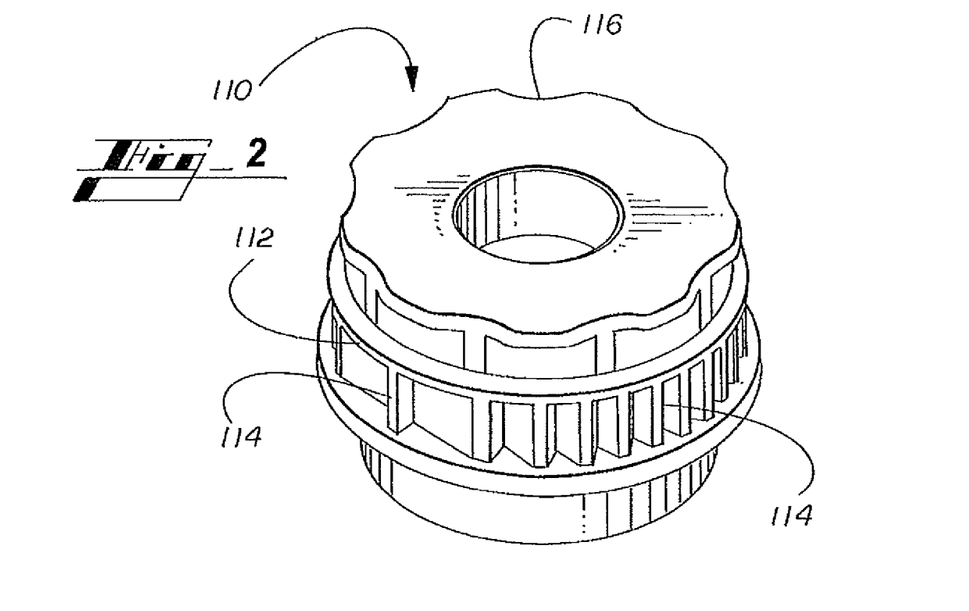
FIGS. 2-4 illustrate various views of an example of the bag-side connector in accordance with an embodiment of the present disclosure.
Figure 3:
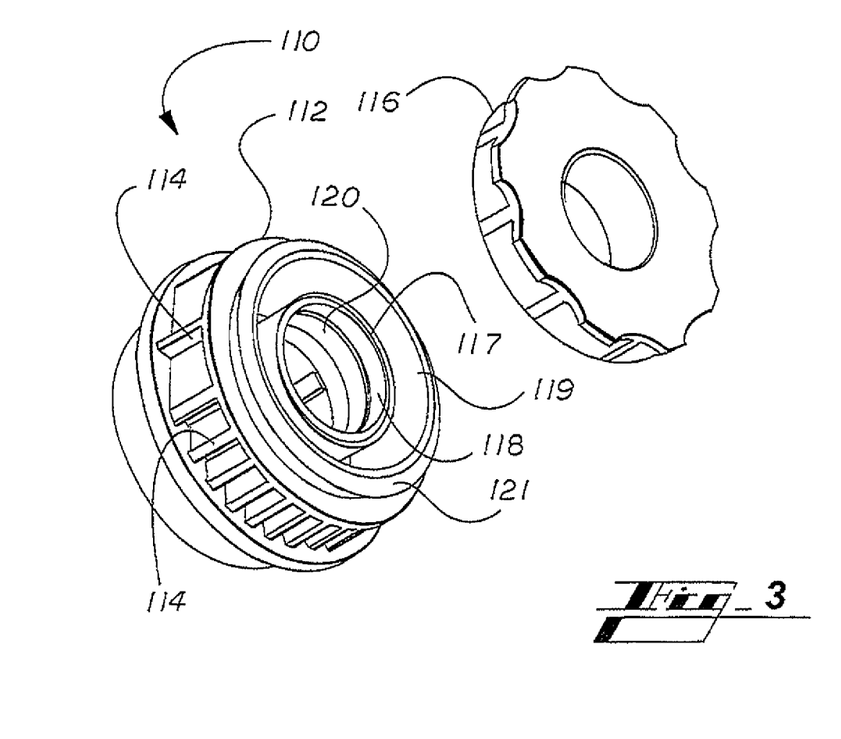
Figures 4, 5:
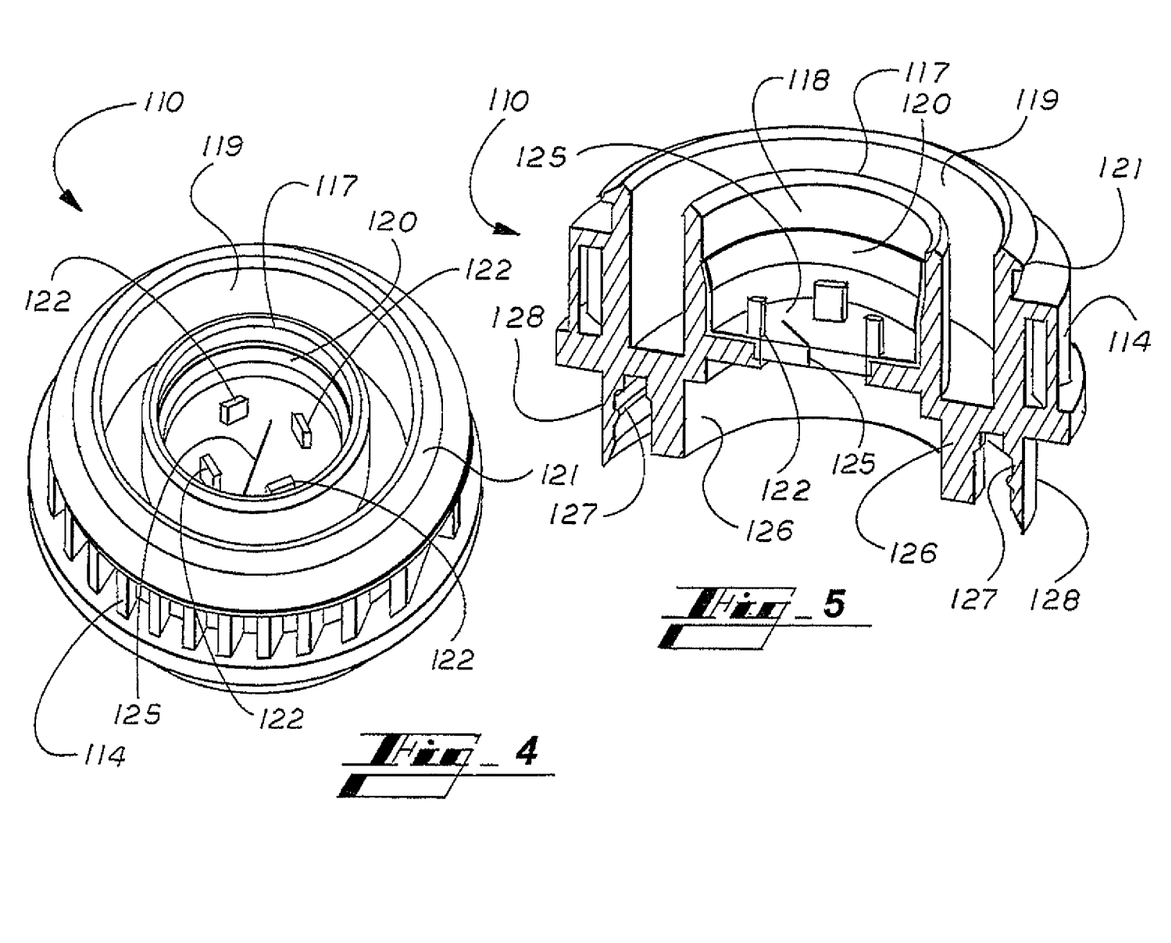
FIGS. 5-7 illustrate various cutaway views of an example of the bag-side connector in accordance with an embodiment of the present disclosure.

The bag-side connector 110 is discussed in more detail with respect to FIGS. 2-7. FIGS. 2-4 illustrate views of the bag-side connector 110 including a valve case 112 having an external hand grip 114 and a cap 116 covering a portion of the bag-side connector 110 that engages the line-side connector 150. The external hand grip 114 allows the bag-side connector 110 to be fastened to a bag gland (not shown) via annular collars 126, 128, shown in FIGS. 5-7. The cap 116 covers the components of the bag-side connector 110 to protect and prevent contamination of the components. Annular collars 117, 119, and an engagement lip 121 are arranged and configured to engage a corresponding engagement lip 172 on the line-side bag 150, as shown, in FIGS. 8, 11 and 13, to fittingly secure the bag-side connector 110 to the line-side connector 150. The bag side connector 110 also includes a line-side interface 118 having a substantially cup-shaped elastomeric seal 120, one or more valve actuation members 122, and an elastomeric membrane 124. In at least one embodiment, the elastomeric membrane 124 is centrally disposed and includes one or more slit(s) 125, cut(s), or similar structure(s) that are arranged and configured to function as a one-way valve. The slit(s) 125 are arranged and configured to remain closed until a differential pressure is created across the elastomeric membrane 124. The elastomeric membrane 124 remains closed before and after the bag-side connector 110 is connected to the line-side connector 150 and only opens when vacuum is applied creating a differential pressure between the two sides of the membrane 124. The one-way valve created by the elastomeric membrane prevents the mixing of product from within the bag gland and in the line, and reduces the risk of contamination of the bag when connected to the line by reducing the introduction, for example, of microbiological contaminants and other foreign matter.

Figure 6:
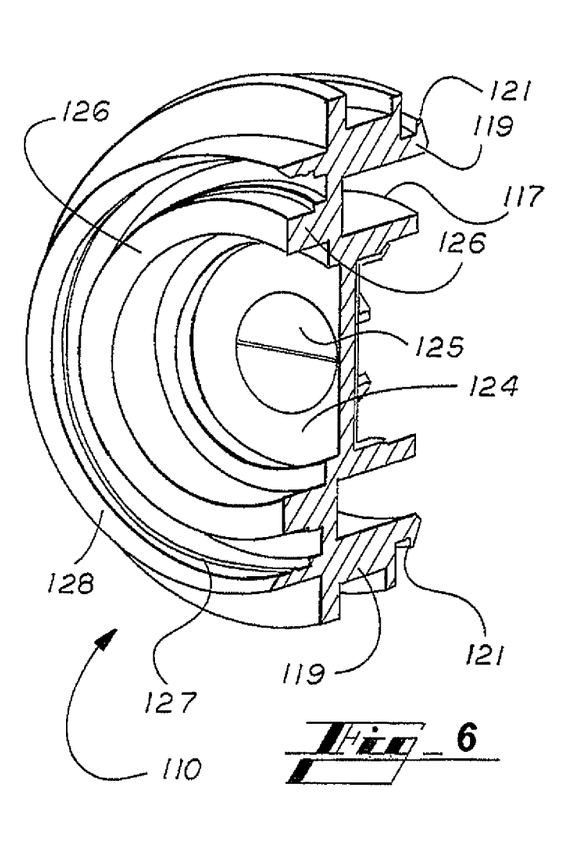
Figure 7:
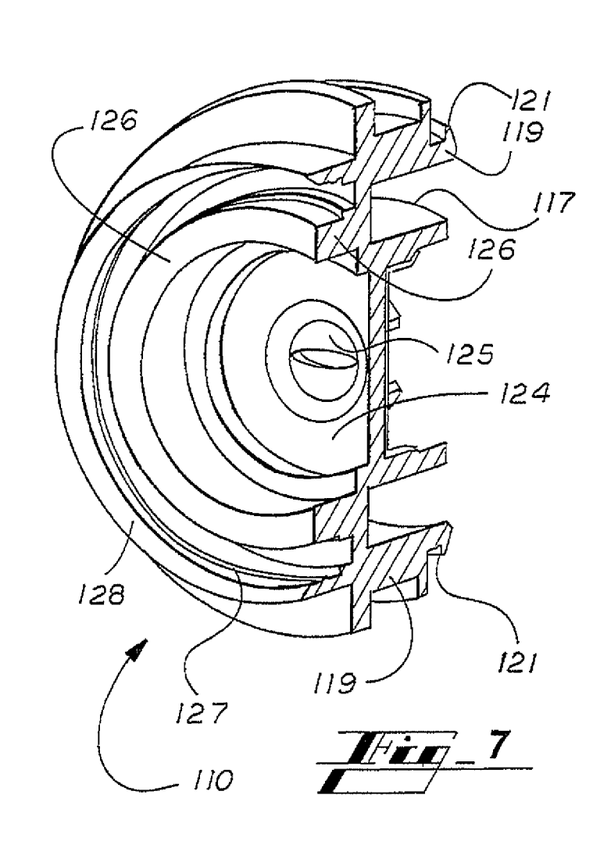

FIGS. 5-7 illustrate cutaway views of the bag-side connector 110 including the components on the bag-side of the bag-side connector 110. In addition to the components discussed above, the bag-side connector 110 includes annular collars 126, 128, having at least one gland interface 127 arranged and configured to engage the bag gland. A variety of suitable fasteners may be used to fasten the bag-side connector 110 to the bag gland including, for example, threaded connectors, pressure fittings, snap fittings, and the like. The annular collar 126 creates an opening that exposes the product within the bag gland to the elastomeric membrane 124. The elastomeric membrane 124 remains closed both prior to and after being connected to the line-side connector 150. The slit(s) 125 of elastomeric membrane 124 open only after pressure is applied to the membrane creating a differential pressure across the membrane sufficient to displace the slit(s) 125. As illustrated in FIG. 7, upon the application of sufficient pressure, the slit(s) 125 of elastomeric membrane 124 are displaced such that product can be dispensed from the bag through the slit(s) 125. As illustrated in FIG. 6, upon the pressure being removed from the elastomeric membrane 124, the pressure across the elastomeric membrane 124 returns substantially to equilibrium and the slit(s) 125 return to a closed position. The slit(s) remain closed until pressure is again applied to the elastomeric membrane 124.

Figure 8:
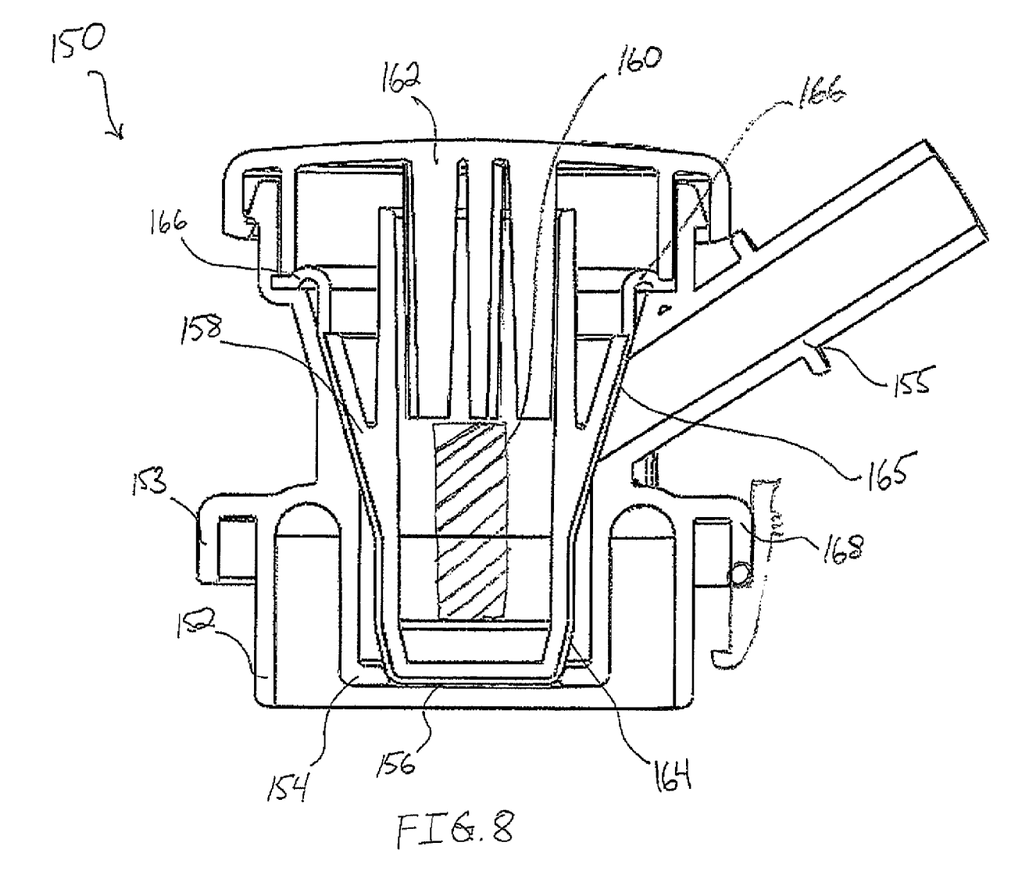
FIG. 8 illustrates a cutaway view of an example of the line-side connector in accordance with an embodiment of the present disclosure.
Figure 9:
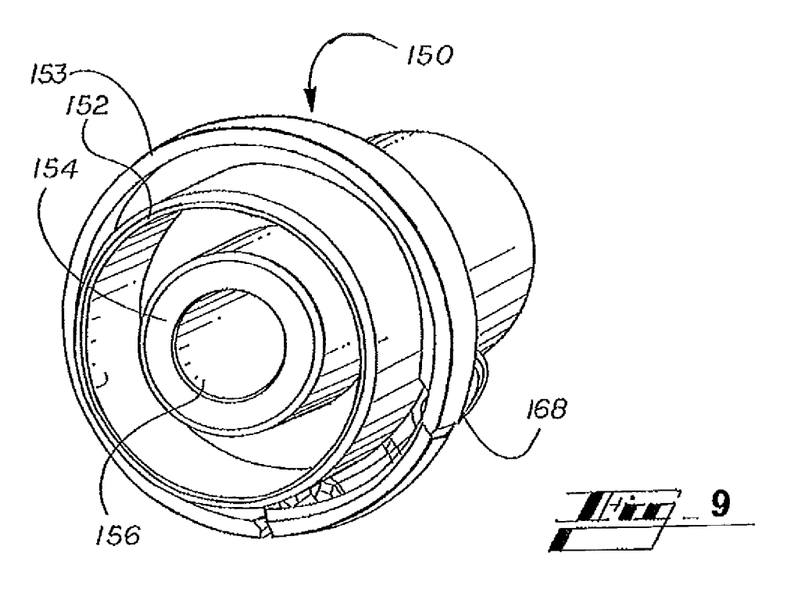
FIG. 9 illustrates a view of an example of the line-side connector in accordance with an embodiment of the present disclosure, including the nose.

FIGS. 8 and 9 illustrate the line-side connector 150 in accordance with an embodiment of the present disclosure. The line-side connector 150 includes annular collars 152 and 153 that are arranged and configured to fittingly engage annular collars 117, 119 of the bag-side connector 150. The annular collar 152 surrounds a nose 154 that extends longitudinally within the line-side connector 150. The nose 154 includes a substantially centrally disposed opening 156. The nose 154 and the opening 156 are configured and arranged to be in fluid communication with the elastomeric membrane 124 and slit(s) 125, upon connection of the line-side connector 150 to the bag-side connector 110. The nose 154 substantially encloses at least a portion of a longitudinally extending elastomeric boot 164. The elastomeric boot 164 encloses thermoplastic plunger 158 and a spring 160 to create a valve. The plunger 158 and elastomeric boot 164 form a seal at opening 156. The plunger 158 and elastomeric boot 164 include at least a conical portion that abuts with and forms a seal 165 at the vacuum line 155 when plunger 158 is in the closed position. In this state, the vacuum line 155 is sealed and no vacuum is applied within line-side connector 150. Therefore, no force is applied on the main seal 156,158,164 formed by the plunger 158 and elastomeric seal 164 at the opening 156, and the spring 160 only has to apply relatively light pressure to maintain the seal 156, 158, 164. These conditions allow for a relatively weak spring to be used as spring 160. The use of a relatively weak spring at 160 allows for a similarly weak connection force to be applied when connecting the line-side connector 150 and bag-side connector 110. The use of a relatively weak connection force improves user connection experience by making it easier to connect and disconnect the line-side connector 150 and bag-side connector 110.

The elastomeric boot 164 also includes one or more seals 166, such as gator seals, that are configured and arranged to be longitudinally displaced upon the application of sufficient differential pressure. The seals 166 thereby create a flow path between opening 156 and the vacuum line 155 via the interior of connector body and the exterior of the elastomeric boot 164/plunger 158 upon the plunger 158 being deformed by the actuation members 122 of bag-side connector 110. However, when the seal 165 remains closed, no differential pressure is created across the seals 166, and the seals 166 remain intact and not deformed. The one or more seals 166 also isolate the plunger 158 and spring 160 from product flowing through the opening 156 and along the side of the elastomeric boot 158.

The one or more seals 166 isolate the plunger 158 and spring 160 from the product which helps to eliminate dead-spots within the flow path created by obstructions, build-up and the like. Isolating the plunger 158 and spring 160 from the product also improves cleaning of the bag-side connector 150. The thermoplastic plunger 158 also includes a spring retaining end cap 162 that encloses the thermoplastic plunger 158 and retains the spring 160 in place. The spring 160 maintains the plunger 158 at the opening 156 and thereby maintains the seal 156, 158, 164 and seal 165 in the closed position. The bag-side connector also includes an attachment/release element 170 having an engagement lip 172. The attachment/release element 170 and engagement lip 172 are arranged and configured to fittingly engage the annular collar 119 and engagement lip 121 of the bag-side connector 110 to secure the line-side connector 150 to the bag-side connector 110. The attachment/release element 170 includes a resilient actuation element 168, such as a stainless steel spring, that holds the attachment/release element 170 in position to ensure that the connectors 110, 150 remain fittingly and securely attached. The resilient actuation element 168 also allows the connectors 110, 150 to be easily and readily disconnected.

Figure 10:
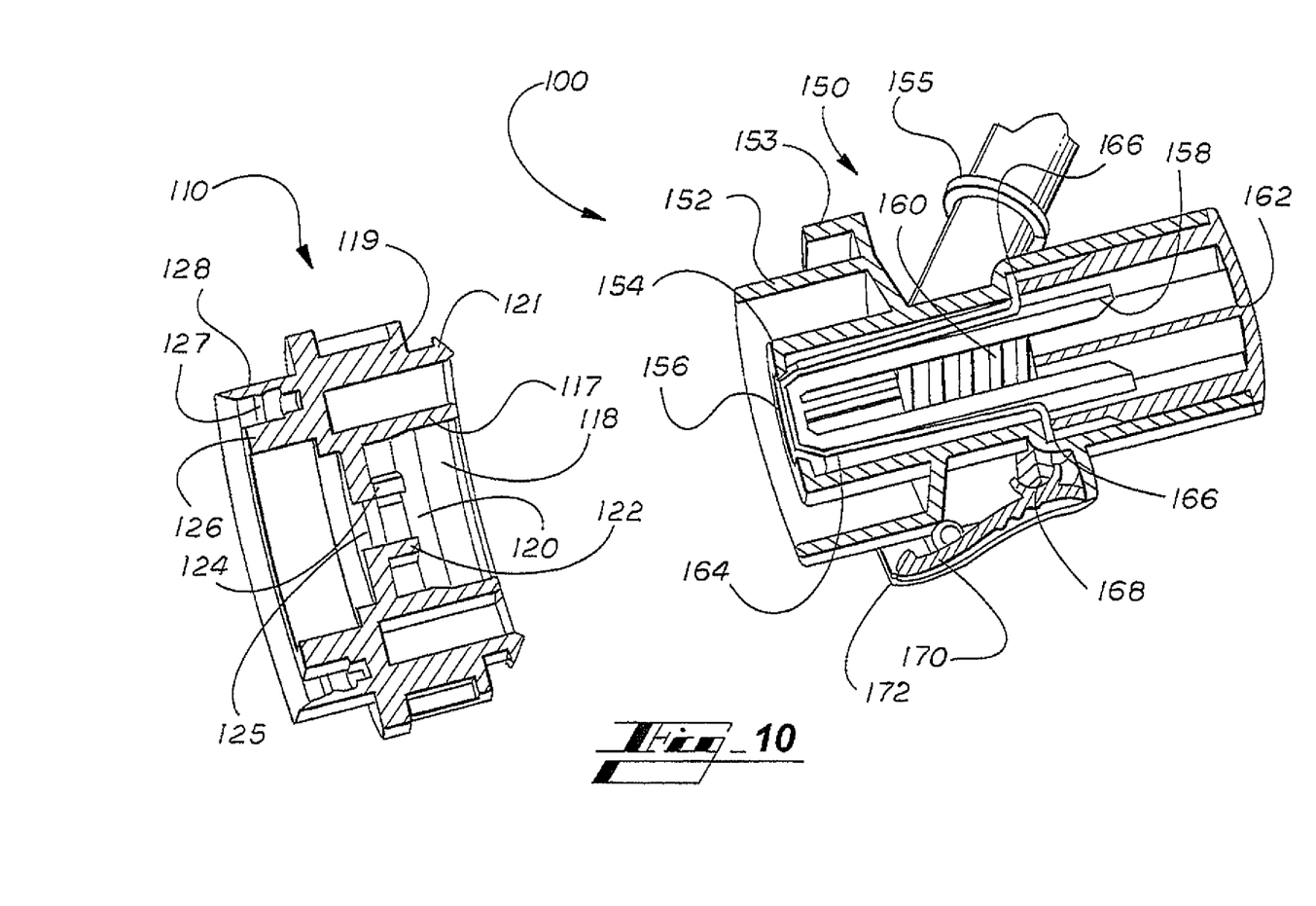
FIGS. 10-12 illustrate the bag-side connector and line-side connector of the connector system in accordance with an embodiment of the present disclosure, prior to, during, and after connection, respectively.
Figure 11:
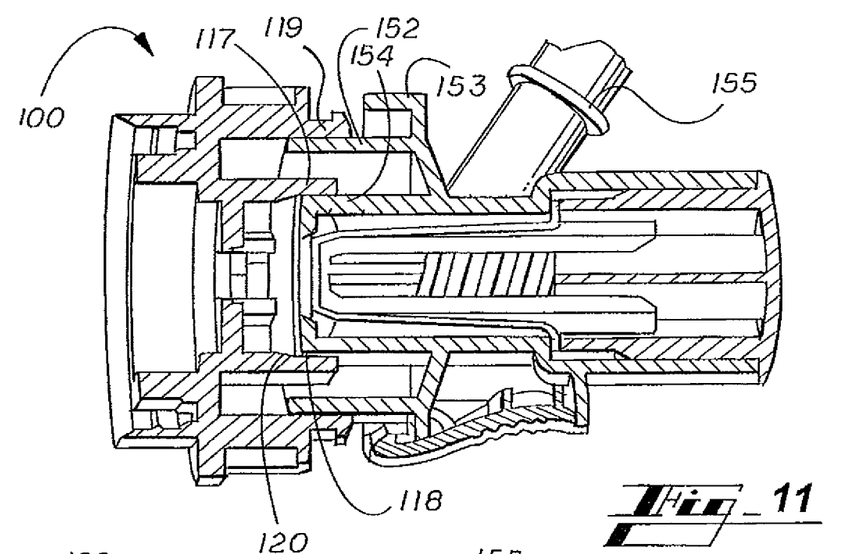
Figure 12:
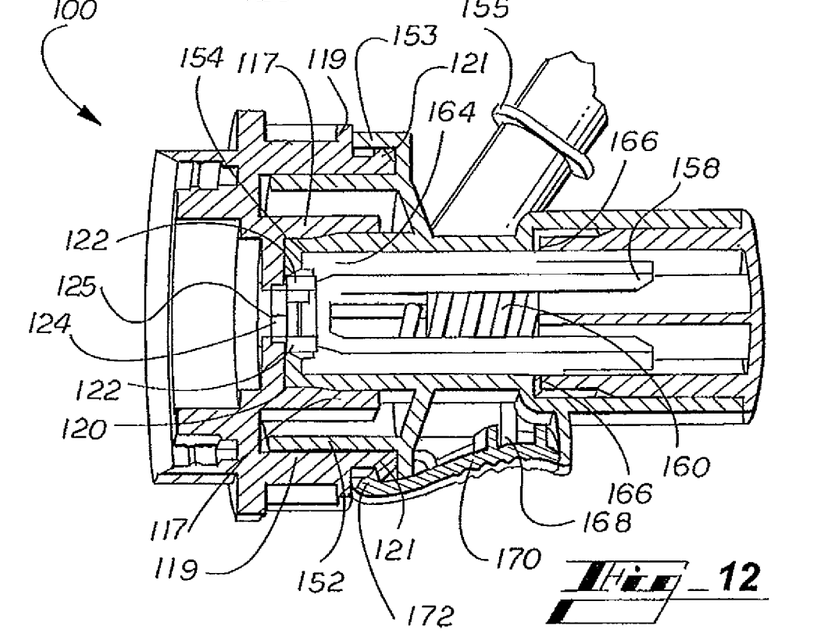

FIGS. 10-12 illustrate the connector system 100 according to at least one embodiment of the present disclosure in various stages of use. FIG. 10 illustrates the connector system 100, including bag-side connector 110 and line-side connector 150, prior to attachment. FIG. 11 illustrates the connector system 100, including bag-side connector 110 and line-side connector 150, during attachment. FIG. 12 illustrates the connector system 100, including bag-side connector 110 and line-side connector 150, after attachment. The following discussion provides an overview of the deployment of the connector system 100. The cap (not shown) must be removed from the bag-side connector 110 prior to connection in order to expose the annular collars 117, 119, the attachment lip 121 and other components (discussed above). While disengaged the valve arrangement of each connector remains closed, i.e., the elastomeric membrane 124 and the slit(s) 125 combination of bag-side connector 110 and the plunger 158, the elastomeric boot 156, and the spring 160 combination of the line-side connector 150 remain closed while the connectors are disengaged. In order to connect to two connectors 110, 150, the bag-side connector 110 and line-side connector 150 are urged together such that the annular rings 117, 119 and the annular rings 152, 153 engage each other, see FIG. 11. As the connectors 110, 150 engage each other the nose 154 of the connector 150 fittingly engages the cup-shaped elastomeric seal 120 at the line-side interface 118 to seal the line-side connector 150 into the bag-side connector 110. As the two connectors 110, 150 are urged together the valve arrangements of each connector remains closed. As the two connectors 110, 150 are urged together, the attachment lips 121 of the bag-side connector 110 and the attachment lip 172 of the line-side connector 150 snap together to fittingly secure to each other. When the two connectors are secured to each other, the valve actuation member(s) 122 deform the plunger 158 thereby opening the valve of the line-side connector 150. The valve (elastomeric membrane 124) of the bag-side connector remains closed until pressure is applied to the membrane 124 to create a differential pressure sufficient to open the slit(s) 125 of the membrane 124. The slit(s) 125 are arranged and configured to remain closed until a differential pressure is created across the elastomeric membrane 124. The elastomeric membrane 124 remains closed before and after the bag-side connector 110 is connected to the line-side connector 150 and only opens when vacuum is applied creating a differential pressure across the two sides of the membrane 124.

While the present disclosure has been described in terms of particular preferred and alternative embodiments, it is not limited to those embodiments. Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

We claim:

1. A dispensable product line connector, comprising:
a body member having at least one engagement structure, wherein the engagement structure is configured to engage a bag-side connector;
a valve formed within the body member, the valve including:
a cylindrical member having an opening formed in an end of the cylindrical member;
a plunger disposed within the cylindrical member, wherein the plunger includes a substantially cylindrical shape portion and a substantially conical shape portion; and
a resilient member in communication with the plunger, wherein the resilient member maintains the substantially cylindrical shape portion of the plunger adjacent the opening in the cylindrical member; and
a vacuum line formed within the body member, wherein the substantially conical shape portion of the plunger abuts with and forms a first seal at an opening located at an end of the vacuum line at an interface with the cylindrical member when the plunger is in a closed position, and wherein the substantially cylindrical shape portion of the plunger abuts with and forms a second seal at the opening formed in the end of the cylindrical member.

2. The dispensable product line connector according to claim 1, wherein the plunger creates a seal at the vacuum line prior to the plunger being displaced by an actuation member of the bag-side connector.

3. The dispensable product line connector according to claim 1, wherein the plunger creates a seal at the opening formed in the end of the cylindrical member prior to the plunger being displaced by an actuation member of the bag-side connector.

4. The dispensable product line connector according to claim 1, wherein the substantially cylindrical shape portion of the plunger forms a seal at the opening formed in the end of the cylindrical member, prior to the plunger being depressed by a valve actuation structure of the bag-side connector.

5. The dispensable product line connector according to claim 1, wherein the substantially conical shape portion of the plunger forms a seal at the vacuum line, prior to the plunger being depressed by a valve actuation member of the bag-side connector.

6. The dispensable product line connector according to claim 1, wherein the engagement structure includes an engagement lip, and wherein the engagement lip is configured to engage a corresponding structure of the bag-side connector.

7. The dispensable product line connector according to claim 1, wherein the valve is configured to be opened by a valve actuation structure of the bag-side connector.

8. The dispensable product line connector according to claim 1, further comprising a boot that substantially surrounds at least an end of the plunger, wherein he boot includes a substantially cylindrical shape portion and a substantially conical shape portion.

9. The dispensable product line connector according to claim 8, wherein the boot is formed of an elastomeric material.

10. The dispensable product line connector according to claim 9, further comprising a longitudinally displaceable seal attached to the boot and configured to create a flow path between the opening formed in the end of the cylindrical member and the opening located at the end of the vacuum line at the interface with the cylindrical member, wherein the seal isolates the plunger and the resilient member from product flowing through the flow path.

11. A dispensable product line connector, comprising:
a body member having at least one engagement structure, wherein the engagement structure is configured to connect to a bag that stores a dispensable product;
a valve formed within the body member, wherein the valve comprises:
a substantially cylindrical member having an opening formed in an end of the cylindrical member;
a plunger disposed within the cylindrical member, wherein the plunger includes a first portion having a substantially cylindrical shape and a second portion having a substantially conical shape;
an elastomeric boot that substantially surrounds at least a portion of the plunger; and
a resilient member in communication with the plunger, wherein the resilient member maintains the plunger adjacent the opening in the cylindrical member; and
a vacuum line formed within the body member, wherein the substantially conical shape portion of the plunger abuts with and forms a seal at an opening located at an end of the vacuum line at an interface with the cylindrical member when the plunger is in a closed position, and wherein the substantially cylindrical shape portion of the plunger abuts with and forms a seal at the opening formed in the end of the cylindrical member.

12. The dispensable product line connector according to claim 11, wherein the plunger creates a seal at the vacuum line prior to the plunger being displaced by an actuation member of a bag-side connector.

13. The dispensable product line connector according to claim 11, wherein the plunger creates a seal at the opening formed in the end of the cylindrical member prior to the plunger being displaced by an actuation member of a bag-side connector.

14. The dispensable product line connector according to claim 11, wherein the substantially cylindrical shape forms a seal at the opening formed in the end of the cylindrical member, prior to the plunger being depressed by a valve actuation structure of a bag -side connector.

15. The dispensable product line connector according to claim 11, wherein the substantially conical shape forms a seal at the vacuum line, prior to the plunger being depressed by a valve actuation member of a bag-side connector.

16. The dispensable product line connector according to claim 11, wherein the valve is configured to be opened by a valve actuation structure of a bag-side connector.

17. A product dispenser connector system, comprising:
a product bag connector, comprising:
a body member having at least one engagement structure;
an elastomeric membrane disposed within the body member and includes at least one slit disposed substantially in the center of the membrane;
at least one actuation member disposed within the body member, wherein the at least one actuation member is configured to open a valve of a product dispenser line connector; and, a bag interface formed within the body member, wherein the bag interface is configured to fittingly engage the body member with a product bag; and
the product dispenser line connector, comprising:
a body member having at least one engagement structure, wherein the engagement structure is configured to engage the product bag connector;
the valve being formed within the body member, the valve including:
a cylindrical member having an opening formed in an end of the cylindrical member;
a plunger disposed within the cylindrical member, wherein the plunger includes a substantially cylindrical shape portion and a substantially conical shape portion; and
a resilient member in communication with the plunger, wherein the resilient member maintains the substantially cylindrical shape portion of the plunger adjacent the opening in the cylindrical member; and
a vacuum line formed within the body member, wherein the substantially conical shape portion of the plunger abuts with and forms a seal at an opening located at an end of the vacuum line at an interface with the cylindrical member when the plunger is in a closed position, and wherein the substantially shape portion of the plunger abuts with and forms a seal at the opening formed in the end of the cylindrical member.

18. The dispensable product bag connector according to claim 17, wherein the elastomeric membrane includes a substantially cup-shaped structure.

19. The system according to claim 18, wherein the substantially cup-shaped structure forms a seal with the product dispenser line connector.

20. The system according to claim 17, wherein the product bag stores a product to be dispensed, and wherein the product to be dispensed is a fluid.

* * * * *